Feb. 24, 1931.  F. F. BUCHANAN  1,794,224
LICENSE TAG HOLDER FOR AUTOMOBILES
Filed June 21, 1928
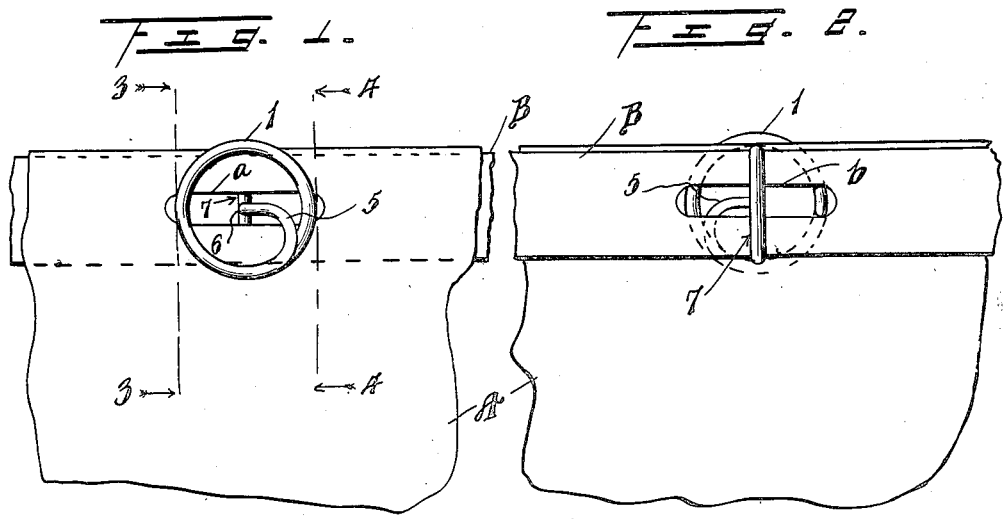
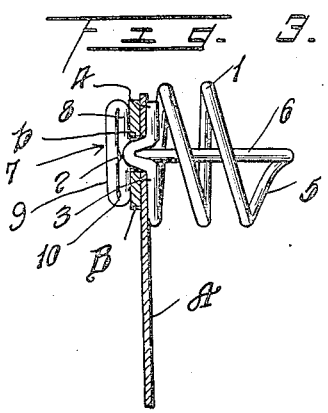
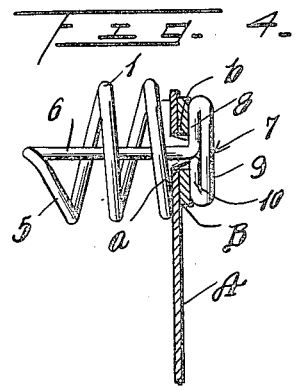
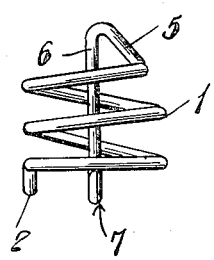
Inventor
F. F. Buchanan.
By L. F. Randolph Jr.
Attorney Patented Feb. 24, 1931

1,794,224

UNITED STATES PATENT OFFICE

FREDERICK F. BUCHANAN, OF MACHIPONGO, VIRGINIA

LICENSE-TAG HOLDER FOR AUTOMOBILES

Application filed June 21, 1928. Serial No. 287,088.

The invention relates to means for attaching license tags to brackets provided therefor on automobiles, and has for its object the provision of a device including a resilient member having means formed integral therewith to engage through the openings provided in the license tag and bracket to hold the license tag in position on the bracket, the resilient member preventing rattling of the parts or loosening of the fastening means and at the same time provides a device that is quickly installed and removed.

A further object of the invention is the provision of a fastener for license tags comprising a convolute expansible spring having a projection formed adjacent to one end of the spring by bending the spring wire, said projection being adapted to engage in the opening in the license tag and bracket provided therefor, while the other end of the spring is formed with an inturned portion having an extension arranged through the spring and its extremity bent to provide a cross head, said cross head being adapted to engage through the same openings in the tag and bracket and the entire device providing a resilient fastening means that is quickly installed and removed and when in position prevents loosening and rattling of the license tag relatively to the bracket.

The invention will be described in detail hereinafter and will be found illustrated in the accompanying drawings in which—

Figure 1 is a front face view showing a fragment of a license tag and bracket and the holder in position, Figure 2 is a rear view of the part shown in Figure 1, Figures 3 and 4 are sectional views on planes indicated by the lines 3—3, and 4—4, respectively, of Figure 1, and Figure 5 is a side view in elevation of the holder, the view being taken from a point ninety degrees removed from the point of view in Figures 3 and 4.

In the drawings similar reference characters are used to designate corresponding parts throughout the several views.

The holder is designed to secure a license tag, designated A, to a bracket B, the license tag being provided with slotted opening $a$ that alines with a slotted opening $b$ in the bracket B, and the holder hereinafter described is used in place of bolts and nuts usually employed for holding the license tag on the bracket. The holder comprises an expansible convolute spring 1 having adjacent to one of its ends a pointed projection 2 that is formed by bending or undulating the wire forming the spring, said pointed projection being adapted to be inserted into the slo..s $a$ and $b$, so that the wire on each side thereof designated 3 and 4 rests upon and presses against the license tag A on each side of the slot $a$ to securely hold the license tag in engagement with the bracket B. The other end of the spring 1 is provided with a portion 5 that is extended upwardly longitudinally of the spring and inclined toward the axis of the spring, and has an integral extension 6 that extends axially through the spring coils and is formed with a cross head 7 that is provided by bending the wire laterally as shown at 8 and then returning it as shown at 9 and the extremity of the wire returned as shown at 10.

In mounting the license tag on the bracket, the cross head 7 will be first inserted through the alined slots $a$ and $b$, and then by giving the spring a turn through an arc of substantially ninety degrees the cross head 7 will be in the position shown in Figures 1, 2, 3 and 4, and the pointed projection 2 will engage in the slots $a$ and $b$ to securely hold the tag on the bracket.

What is claimed is:—

A license tag holder, comprising an expansible convolute spring having an outwardly directed undulation formed adjacent to one end thereof and adapted to enter alined openings in a license tag and a bracket therefor, said undulation being substantially V-shaped, the wire forming the spring at each side of said undulation adapted to seat against the license tag when in position, the other end of said spring being provided with a portion extended longitudinally away from and inclined towards the axis of the convolutions of the spring, an integral extension from said inwardly bent portion extending axially through the convolutions, and the extremity of said extension being provided with a cross head formed by bending the wire outwardly from said extension and returned thereon, with a returned extremity having its terminal ending in abutting relation with the first bend forming the cross head, said cross head being adapted for insertion through the openings aforesaid and by giving the spring a quarter turn engaging the bracket on the side remote from the seat for the first mentioned end of the spring.

In testimony whereof I affix my signature.

FREDERICK F. BUCHANAN.